United States Patent Office 3,527,677
Patented Sept. 8, 1970

3,527,677
PROCESS FOR DEHYDRATION OF AQUEOUS ACRYLIC ACID SOLUTIONS BY EXTRACTIVE - AZEOTROPIC DISTILLATION WITH 2-ETHYLHEXANOL OR 2-ETHYLHEXYLACRYLATE
Jerome W. Harpring, New Bern, N.C., assignor to The B. F. Goodrich Company, New York, N.Y., a corporation of New York
Filed Mar. 6, 1969, Ser. No. 804,969
Int. Cl. B01d 3/36; C07c 51/46, 57/04
U.S. Cl. 203—15                                    3 Claims

ABSTRACT OF THE DISCLOSURE

A two-step process for dehydrating aqueous solutions of acrylic or methacrylic acids comprises a first step wherein such aqueous solution is subjected to extractive azeotropic distillation employing 2-ethylhexanol and/or 2-ethylhexyl acrylate as an azeotroping agent forming an overhead vapor stream of an azeotrope containing at least 70%/wt. of water and an essentially anhydrous bottoms stream of the acid and azeotroping agent. In the second step the dry still bottoms stream of the first stage is fractionally distilled to effect separation into an overhead stream of the dry or glacial acrylic acid and a dry second stage bottom stream of the azeotroping agent(s) which is recycled to the first step. Optionally, make-up azeotroping agent can be 2-ethylhexanol and the dry, second stage bottoms stream can be split and a slip stream distilled in an optional third step to separate out a relatively pure 2-ethylhexyl acrylate for use and sale as such.

BACKGROUND OF THE INVENTION

Description of prior art

There is a rapidly growing demand for concentrated or glacial forms of acrylic and methacrylic acids. These acids are conventionally produced either by the catalytic oxidation of propylene (acrylic acid) or isobutylene (methacrylic acid) or by the hydrolysis of acrylonitrile or methacrylonitrile. In the oxidation process the hot reactor effluent gases are quenched in water producing directly an aqueous solution containing not more than about 50 to 55%/wt. of the acid. Hydrolysis procedures likewise produce dilute aqueous acid solutions. Heretofore, these dilute aqueous solutions have been dehydrated by azeotropic distillation employing benzene as the azeotroping agent. The latter procedure suffers from several very serious defects principal of which are high cost and the production of acrylic acid products contaminated by small amounts of benzene raising difficult problems of toxicity in some of the uses of the product acid. The high cost of the latter procedure is due to high mutual solubilities of water and benzene, on the one hand, and of acrylic acid and benzene on the other plus a low water content of the water/benzene azeotrope, all of which require large distillation columns with their necessarily high capital investment costs and high energy consumptions.

SUMMARY OF THE INVENTION

According to the present invention, an aqueous solution of an acrylic acid such as acrylic acid or methacrylic acid is dehydrated and a high purity concentrated or glacial form of the acrylic acid in question is produced by a process comprising at least two steps. In the first of such steps, the aqueous acid solution is introduced at an intermediate point in a distillation column and an extraction/azeotroping agent selected from the class consisting of 2-ethylhexanol, 2-ethylhexyl acrylate and mixtures of the two is introduced to the distillation column at a point somewhat above the entrance of the acid stream. Under steady state conditions the thus combined streams pass down the column counter-current to the mixed vapors rising from the still pot which progressively increase in water content as the latter is extracted from the downcoming liquid and progressively decrease in acid content as they approach the top of the tower due to the extraction of the acid from the vapor by the downcoming liquid. Liquid remaining in the still bottom under steady state operation is an essentially dry mixture of acid and azeotroping agent. With this feed arrangement the column operates, in the region above the crude acid feed-point, as an acid stripping zone operating on a stream of azeotrope vapor low in the higher boiling acrylic acid, whereas in that portion below the acid feed entrance the column operates as a water-stripping zone wherein water is stripped out of the downcoming liquid feed and released as the azeotrope vapor. The separation between water and the acrylic acid is exceptionally sharp with such an arrangement.

The azeotroping agents of this invention, 2-ethylhexanol, 2-ethylhexyl acrylate, and mixtures thereof have exceptional efficiency in the process. In the first place, they form azeotropes of exceptionally rich in water. Of the two agents, 2-ethylhexanol is slightly more efficient at water-removal, this agent forming a water azeotrope containing 80–90%/wt. of water. The water azeotrope with 2-ethylhexyl acrylate contains 75 to 80%/wt. of water.

More importantly, these agents are so highly immiscible with water that when the overhead azeotrope vapors are condensed they readily form immiscible layers of water and azeotroping agent easily separated by a simple decantation. The upper organic layer can be recycled to the first-stage column directly and the lower aqueous layer discarded or treated to recover any small remaining acid content.

Another important advantage of these azeotroping agents is their exceptionally high boiling points well above those of the acrylic acids (ca. 200° C. for 2-ethylhexyl-acrylate; ca. 180° C. for 2-ethylhexanol; ca. 163° C. for methacrylic acid; and ca. 141.9° C. for acrylic acid). These wide boiling point differentials make separation of the glacial acrylic acid from dry still bottoms material of the first stage a matter of simple fractional distillation in a vacuum distillation column of modest size and cost.

When 2-ethylhexanol is added as the sole azeotrope make-up, it is recognized that a small proportion of the alcohol, per pass, are unavoidably consumed by interaction with the acrylic acid forming 2-ethylhexyl acrylate. This does not result in a significant loss of efficiency in water removal because of the high water-removing capacity of 2-ethylhexyl acrylate. Also, this loss of the alcoholic agent is not entirely disadvantageous since 2-ethylhexyl acrylate is a commercially important monomer which would find even a larger market than it presently enjoys were it available at lower prices. Thus, it is entirely practical to operate the dehydration process of this invention as a conjoint dehydration/esterification process by adding 2-ethylhexanol as makeup and splitting out a slip-stream of 2-ethylhexyl acrylate as a saleable by-product.

THE PROCESS

The process of this invention is carried out in two consecutive, essential steps, namely (1) a first step wherein the aqueous solution of an acrylic acid is dehydrated by extractive/azeotropic distillation and (2) the second step wherein the essentially dry or glacial form of the acrylic acid is separated from the azeotroping agent by fractional distillation under vacuum. The dehydration step is carried out in such a manner as to minimize carry-over of the acrylic acid in the azeotrope so as to eliminate expensive waste-water treatments (applied to the water leaving the first stage decanter) now increasingly required by governmental water pollution controls. The sharp separation thus required is achieved, as indicated above, by the use of appropriate reflux ratios in the upper section of the azeotropic distillation column.

The second basic or essential step of the process, namely, the separation of the glacial form of the acrylic acid in question from the dry, first-stage still bottoms material, is effected by a conventional fractional distillation under reflux, preferably carried out under vacuum to lower operating temperatures so as to minimize thermal polymerization of the acrylic acid and/or 2-ethylhexyl acrylate.

Both steps of the process, and particularly the second stage fractional distillation can be effected in the presence of a polymerization inhibitor which can be copper-clad or copper-bearing surfaces in the equipment, an added chemical inhibitor such as phenothiazine, the methyl ether of hydroquinone, methylene blue, and others. Thermal polymerization of the acrylic acid and/or 2-ethylhexyl acrylate is also suppressed by maintaining the temperatures in the columns below about 160° C. by judicious use of vacuum during distillation stages.

Figure 1A:
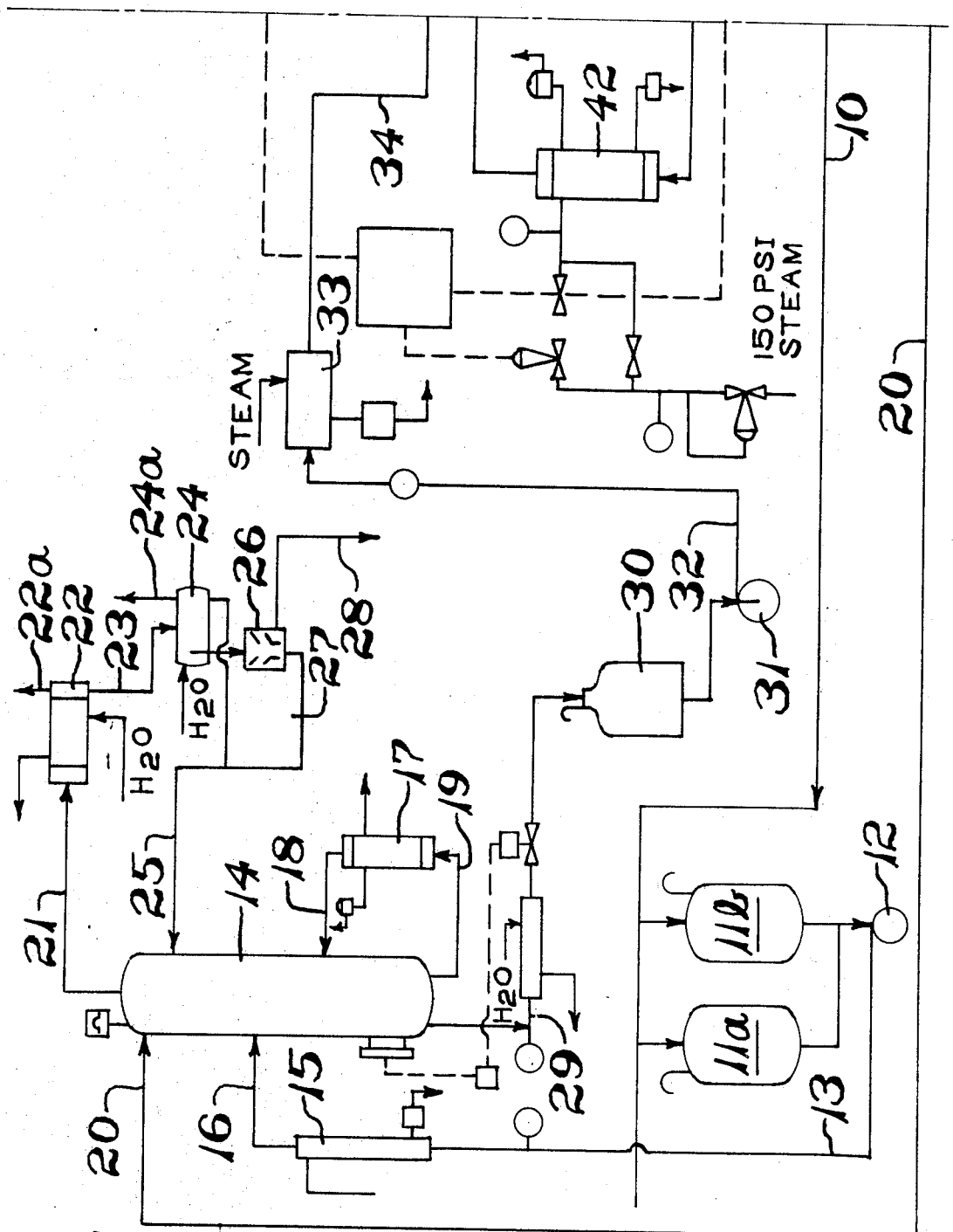
FIGS. 1a and 1b together constitute a schematic flow diagram of a commercial adaptation of the process of this invention.

The method of the invention will be more specifically described with reference to the drawing. As the description progresses, appropriate start-up procedures will be indicated and steady-state operation of each principal item of equipment will be described. A working example is included in the description.

Figure 1B:
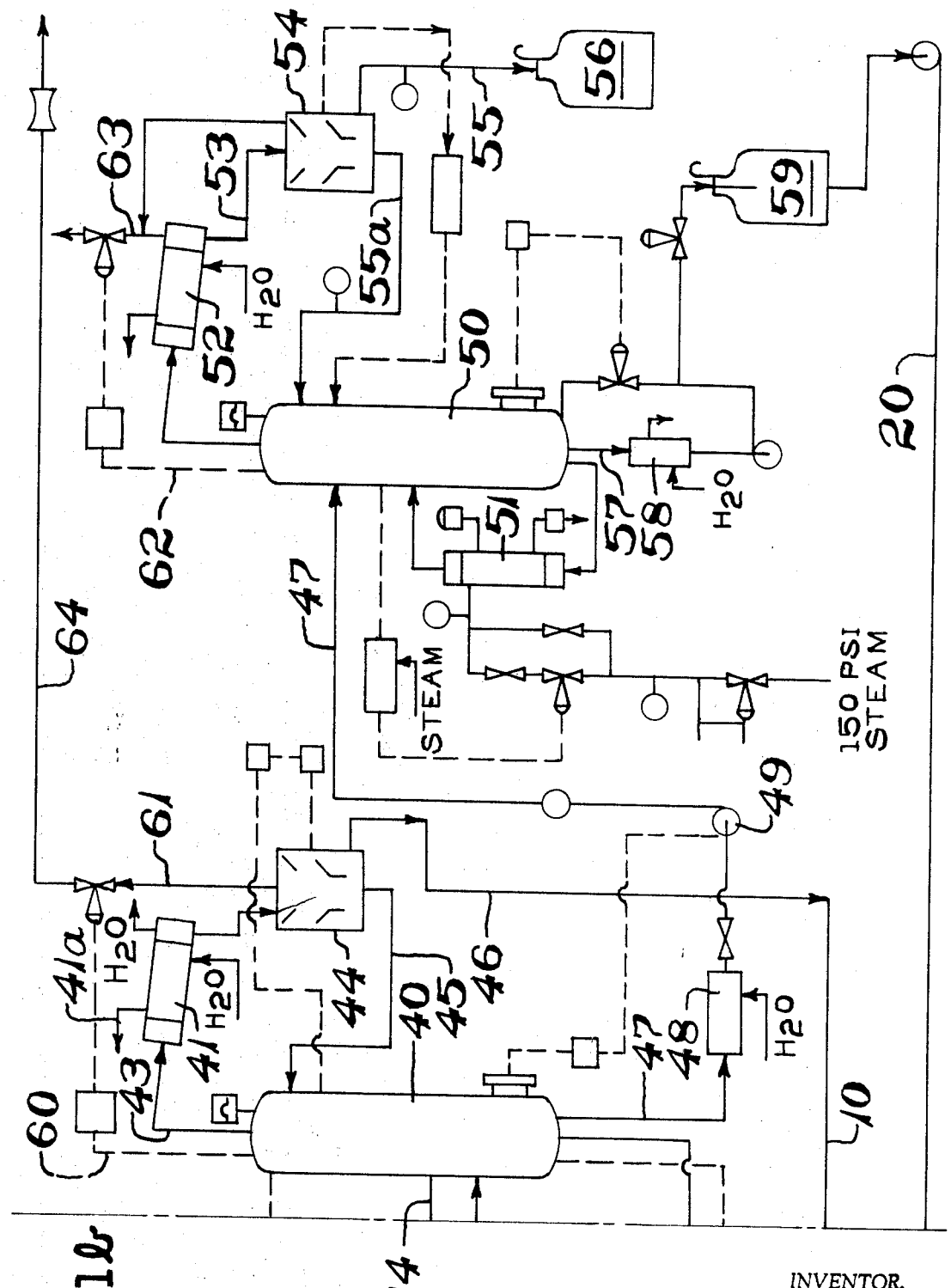

The apparatus shown diagrammatically in FIG. 1 comprises three distillation columns 14, 40 and 50, of which column 14 is an extractive/azeotropic distillation drying column in which water is removed, column 40 is an optional vacuum distillation column operated so as to separately remove as overheads light-ends such as the last traces of water, dissolved propylene (or isobutylene), $CO_2$, air and the like present in the oxide feed, and column 50 is a vacuum fractional distillation column in which the dry or glacial acrylic acid in question is separated as an overhead from the higher boiling azeotroping agents.

The process commences or is started up by charging the still pot of column 14 with a small amount of a crude aqueous acrylic acid solution containing in an actual operating example 31.7% weight of total organic acid moieties which are mainly acrylic acid and small amounts of impurities and the remainder water. As indicated above, such a solution comes from the water quench stage following a catalytic oxidation of propylene or isobutylene. Such a crude solution enters the purification process area through a feed line 10 where it goes to surge tanks 11a, 11b, from whence it is pumped to column 14 by pump 12 and line 13 through a heat-exchanger 15 to a feed-point 16 intermediate the height of column 14. During start-up the crude feed passes directly to the still bottom through a feed by-pass line 13a indicated in dotted line.

As indicated the crude feed is pre-heated, if desired, in pre-heater 15 which may be heated by 30–50 p.s.i.g. steam. Heat is supplied to the material in the still-pot by an external heat exchanger 17. Liquid is taken off one of the trays through line 18 and flows by gravity through the heat-exchanger 17 to the still-pot through line 19. Heat in this case may be supplied by 150 p.s.i.g. steam applied to heat exchanger 17.

Also entering column 14 is a stream of fairly dry azeotroping agent delivered at the top of column 14 through line 20. The latter stream comprises recycle and fresh makeup azeotroping agent coming from condenser 22 and column 50. Note that the azeotroping agent enters column 14 above the crude acid feed input 16 forming an upper stripping section wherein acrylic acid is stripped out of the rising vapors.

As operation of column 14 commences, vapors rising from the still bottom contain at least about 60%/wt. of water together with 2-ethylhexanol, 2-ethylhexyl acrylate, up to 8 or 10%/wt. of acrylic acid and minor amounts of volatile impurities coming into the system in the fresh feed. In the portion of column 14 below acid feed input 16, the cooler descending liquid extracts the higher boiling acrylic acid from the vapors and the heat liberates the water azeotrope such that the acrylic acid content of the vapor decreases and its water-content rises as the vapor ascends the tower.

In that portion of column 14 between the inlet ports 16 and 20 the rising vapors are subjected to intensive fractionation to further lower the concentrations of vaporized acrylic acid and of the azeotroping extraction agents to that of the azeotrope (70–80%/wt. of water). Vapors leaving the top of column 14 will contain only a few tenths of 1%/wt. of acrylic acid when the column is operated at a 1:1 reflux ratio. Under total reflux conditions, the organic portion of the overheads vapor will contain only about 0.02%/wt. of acrylic acid or less. Since column 40 serves to return a substantial proportion of the acrylic acid remaining in the overheads, satisfactory operation of column 14 is usually obtained at more modest and economical reflux ratios of from about 1:1 to about 2:1. In actual operation, the pressure in column 14 will be about atmosphere with the temperature (vapor) at the top being 100° C. and at the bottom (liquid) 108° C.

The vapors leaving column 14 pass through line 21 to a condenser 22 and from thence through line 23 to a decanter 24. Non-condensibles such as propylene, $CO_2$, air, etc., are vented to the atmosphere through vent lines 22a, 24a. In the decanter, the condensed materials are split into three streams; the upper organic layer consisting of 2-ehylhexanol, 2-ethylhexyl acrylate and only about 0.14%/wt. of acrylic acid are returned to column 14 as reflux through line 25. The lower aqueous layer passes to a phase splitter 26 where it is separated into a reflux stream and an overhead aqueous distillate, of which the reflux stream goes back to the column through line 27 for recovery of its small acrylic acid content and the overhead aqueous distillate containing the bulk of the water and water-soluble impurities is discharged from the system through line 28. Stream 28 in the actual example referred to contained over 99.3%/wt. of water, a few tenths of 1% of acrolein and other acidic impurities and not more than a trace of 2-ethylhexanol.

When column 14 reaches steady-state operation the liquid which collects in the still bottom consists almost entirely of the higher boiling azeotroping agents and the acrylic acid plus the more highly soluble contaminants in the feed and, perhaps, a small amount of water. In the actual experiment referred to stream 29 analyzes as containing 5.9%/wt. water, 57.6% acrylic acid and the balance 2-ethylhexanol. This now nearly dry material is withdrawn through line 29 to a surge vessel 30 from whence it is pumped by pump 31 through line 32, pre-heater 33 and line 34 to delighting column 40.

Column 40 is operated under a vacuum of from about 50 to about 150 mm. Hg (in the actual example at 85 mm. Hg) induced by operation of an efficient condenser 41, which may be cooled by brine-cooled water. Feed line 34 enters column 40 at a point just above its midpoint. Heat is supplied to the liquid in the lower part of column by an external heat exchanger 42 which in this case may be heated by 150 p.s.i.g. steam. The vapors of acrylic acid and azeotroping agents liberated in the bottom section of column 40 pass up the column counter-current to a cooler liquid organic reflux (reflux ratio ca. 4:1) coming from condenser 41 through line 45. Under steady-state conditions the temperature of the vapor leaving column 40 is about 60° C. and in the working example contains 30%/wt. of water and 69.6%/wt. of acid moieties. Light-end non-condensibles such as propylene, ethylene, carbon dioxide, air, some water are exhausted to the atmosphere through vent line 41a. The liquid condensate from condenser 41 pass to a phase splitter 44 and from there to column 40 through line 45.

The liquid condensate leaving condenser 41 may be split by splitter 44 into two streams, one being an optional upper layer which is recycled to column 40 through line 45 and the remainder of the liquid which is recycled through lines 46 and 10 to column 14 via surge tanks 11a, 11b.

The liquid which collects in the stillpot (liquid temp. ca. 125° C.) of column 40 analyzes in the working experiment only 0.6%/wt. of water, 47.15% acrylic acid and the remainder 2-ethylhexanol. The latter is withdrawn through line 47, a water-cooled heat-exchanger 48 and pump 49 and introduced at a point intermediate the height of the third column 50 which is a conventional vacuum fractional distillation column (operated at ca. 50 mm. Hg in the example) arranged to operate under reflux at reflux ratios from about 2:1 to about 6:1. The heat-exchanger cools the liquid feed to column 50 to better facilitate fractionation. Liquid collecting in the stillpot of column 50 is heated by an external by-pass type heat exchanger 51. Vapors leaving the stillpot are rich in the acrylic acid but carrying an appreciable proportion of the azetroping agents. The cooler feed liquid descending the lower portion of the column effectively extracts the higher-boiling azeotroping agents. In the section of tower above feed input 47 also operates as a stripping section wherein cooled acrylic acid condensate removes the azeotroping agent to very low levels. Vapor leaving the top of the tower 50 (vapor temp. in working example ca. 54° C.) is essentially dry or glacial form (99.6% acrylic acid in the working example) of the acrylic acid which is condensed in a water-cooled condenser 52. Condensed arylic acid passes by means of line 53 to a phase splitter 54 and product delivery line 55 to a storage vessel 56 from whence it is taken for use or shipment. Phase splitter 54 affords an optional means of feeding cooled liquid acid reflux to the top section of column 50 through optional discharge line 55a.

The liquid which collects in the bottom section of column 50 is an essentially dry mixture of azeotroping agents. The stillpot liquid temperature in the working example was 155° C. The latter liquid is withdrawn through discharge line 57, a water-cooled heat exchanger 58 and is discharged into a surge tank 59. From the latter, the azeotroping agents are withdrawn through line 20 for recycle to column 14. Alternatively, at least a portion of the liquid still bottoms liquid from column 50 may be vacuum distilled to recover as a third still bottoms liquid essentially pure 2-ethylhexyl acrylate for use or sale as such. By means of the valving arrangements in and around the still-bottom and surge tank 59 shown, column 50 can be used for the latter purpose during periods of shutdown. Likewise, such valving arrangements may be employed during start-up to provide a small supply of azeotroping agent as a liquid starting material in the still-pot of column 50. Columns 40 and 50 are connected to a vacuum source (such as steam jets) by means of respectively, vacuum supply lines 60 and 61 and 62, 63 and 64.

The product which accumulates in surge vessel 59 is a quite pure, very dry or glacial form of the acrylic acid in question.

To better demonstrate and illustrate the efficiency of the just-described process the following specific example describes a series of laboratory-scale experiments which are more easily understood. Such examples are illustrative only and are not intended to limit the invention in any way.

Example I.—Into a flask there is charged a mixture of 25 parts/wt. of glacial acrylic acid and 25 parts/wt. of water. The flask is attached to a Braun 25-plate bubble cap jacketted distillation column and heat applied to the flask by an electric mantle. The overhead vapor is condensed and divided into two equal parts by volume. One such part is returned to the column as reflux and the other is collected as product. Such overhead product is found to contain only 7.4%/wt. of acrylic acid.

In a second experiment, the same apparatus is employed and the flask is charged with 25 parts/wt. of glacial acrylic acid, 75 parts/wt. of water and 25 parts/wt. of 2-ethylhexanol. The condensate is arranged to be collected in a decanter which returns the alcoholic organic layer to the column as reflux and the aqueous condensate is split into two equal parts, one such part being returned to the pot and the other taken as product. The latter product is found to contain only 0.89%/wt. of acrylic acid. This experiment indicates not only high separation efficiency between the acid and the water but also the necessity to recover acrylic acid from the aqueous condensate from column 14 in the apparatus described.

A third experiment operates with the same equipment on a charge of 100 parts/wt. of glacial acrylic acid, 100 parts/wt. of water, and 200 parts/wt. of 2-ethylhexanol. Under total reflux, the aqueous portion of the reflux is found to contain only 0.02%/wt. of acrylic acid. This indicates the very sharp separation secured with the method of this invention with reasonable reflux ratios.

I claim:

1. In a process for preparing a glacial acrylic acid from a crude aqueous solution containing less than about 55%/wt. of said acid, the improvement which comprises as a first step extractively distilling said solution in the presence of an azeotroping agent from the class consisting of 2-ethylhexanol, 2-ethylhexyl acrylate and mixtures thereof to remove the bulk of said water in the overhead vapor and leaving an essentially dry bottoms liquid containing said acid and said agent, condensing said vapor and separating as water-immiscible organic layer containing said azeotroping agent for return to said first step and an aqueous layer which is discarded, and, as a second step, fractionating said essentially dry bottoms liquid under vacuum at a temperature below about 160° C. to form, as overhead vapors, the glacial form of said acrylic acid and, as an essentially dry second still bottoms liquid, the bulk of said azeotroping agent, and returning the latter to said first step.

2. The method as claimed in claim 1 and further characterized by said acid being acrylic acid, by said azeotroping agent being 2-ethylhexanol, and by operating the two distillation steps below about 160° C. to minimize thermally-induced polymerization.

3. The method as claimed in claim 1 and further characterized by said acid being acrylic acid, by said azeotroping agent being 2-ethylhexanol, and by, as a third step, fractionally distilling a portion of said second still bottoms liquid under vacuum to produce as a third still bottoms liquid as essentially pure 2-ethylhexyl acrylate by-product and an overhead stream of 2-ethylhexanol which is returned to the said first step.

References Cited

UNITED STATES PATENTS

| 2,922,815 | 1/1960  | Faerber          | 260—526 |
| 3,344,178 | 9/1967  | Brown et al.     | 203—15  |
| 3,414,485 | 12/1968 | Speed            | 203—15  |
| 3,432,401 | 3/1969  | Tcherkawsky      | 203—15  |
| 3,433,788 | 3/1969  | Somekh et al.    | 203—63  |
| 3,433,831 | 3/1969  | Yomiyama et al.  | 203—15  |

WILBUR L. BASCOMB, Jr., Primary Examiner

U.S. Cl. X.R.

203—8, 51, 60, 63, 78; 260—526, 533